(12) United States Patent  
Hsiung et al.

(10) Patent No.: US 7,771,084 B2
(45) Date of Patent: Aug. 10, 2010

(54) LIGHT EMITTING SYSTEM

(75) Inventors: Chien-Chin Hsiung, Taichung (TW);
Keng-Hui Lin, Taichung (TW);
Wen-Lang Hung, Taichung (TW);
Wei-Hsiang Peng, Taichung (TW);
Chao-Yang Ke, Taichung (TW);
Yi-Chung Hung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 280 days.

(21) Appl. No.: 12/146,600

(22) Filed: Jun. 26, 2008

(65) Prior Publication Data
US 2009/0110020 A1 Apr. 30, 2009

(30) Foreign Application Priority Data
Oct. 25, 2007 (TW) ............................. 96140061 A

(51) Int. Cl.
*F21V 21/26* (2006.01)
*G03B 21/32* (2006.01)
(52) U.S. Cl. .................. 362/277; 362/284; 362/259; 353/81; 353/101
(58) Field of Classification Search .............. 362/277, 362/282, 330–332, 259, 318; 353/33, 91, 353/92, 105.101, 81
See application file for complete search history.

(56) References Cited
U.S. PATENT DOCUMENTS

| | | | | | |
|---|---|---|---|---|---|
| 5,416,681 | A | * | 5/1995 | Wu ............................. | 362/284 |
| 5,608,580 | A | * | 3/1997 | Quadri ........................ | 359/831 |
| 6,142,652 | A | * | 11/2000 | Richardson ................. | 362/280 |
| 6,177,217 | B1 | * | 1/2001 | Agostinelli et al. ........... | 430/22 |
| 7,048,408 | B2 | * | 5/2006 | Dallas et al. ................. | 362/202 |

* cited by examiner

*Primary Examiner*—Ali Alavi
(74) *Attorney, Agent, or Firm*—Thomas, Kayden, Horstemeyer & Risley

(57) ABSTRACT

A light emitting system is disclosed, including a light generator, a complex lens and an activating unit. The light generator provides a light beam emitted in a first direction in parallel to an optic axis. The complex lens, disposed on a path of the light beam, includes a plurality of micro structures for refracting the light beam. The activating unit includes an activating member coupled to the complex lens. The activating member activates the complex lens with an activation frequency to reciprocally move in a second direction alternate to the first direction. By the disposition of the complex lens, the energy of the light beam is uniformly distributed. Additionally, speckle produced by the light beam is reciprocally moved within an area by the activating unit, creating a photogene reaction, to successfully eliminate existence of the speckle.

20 Claims, 8 Drawing Sheets

LIGHT EMITTING SYSTEM

BACKGROUND OF THE INVENTION

1. Field of the Invention

The invention relates to a light emitting system, and in particular, to a light emitting system providing a light beam with uniform energy.

2. Description of the Related Art

A projector, comprising a lamp as a light source, forms an image by guiding white light generated by a lamp to a light managing module. The light is separated and recombined by the light managing module, and then light containing image signals is projected out to a projecting surface (a screen).

The laser light beam has characteristics such as polarization, collimation and a single spectrum. When the laser light beam replaces a lamp to become the light source of a projector, the components of the light managing module can be simplified, further reducing the overall size of the projector. Size reduction is currently an objective when developing projectors using laser light beams as the light source. However, when the laser light beam is projected out to a projecting surface (a screen), problems like unevenly distributed energy and speckle exist, causing blurred images. Therefore, an objective is to solve the problem of unevenly distributed energy and speckle for laser light beam projectors.

BRIEF SUMMARY OF THE INVENTION

The invention provides a light emitting system, avoiding unevenly distributed energy and presence of speckle.

An embodiment of the invention provides a light emitting system comprising a light generator, a complex lens and an activating unit.

The light generator provides a light beam emitted in a first direction in parallel to an optic axis.

The complex lens, disposed on a path of the light beam, comprises a plurality of micro structures for refracting the light beam.

The activating unit comprises an activating member coupled to the complex lens with an activation frequency to reciprocally move in a second direction alternate to the first direction.

Another embodiment of the invention provides a light emitting system comprising a light generator, a complex lens and an activating unit.

The light generator provides a light beam emitted in a first direction in parallel to an optic axis.

The complex lens, disposed on a path of the light beam, comprises a plurality of micro structures for refracting the light beam.

The activating unit comprises an activating member coupled to the complex lens with an activation frequency to rotate the complex lens relative to the light generator.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In the following detailed description of the preferred embodiments, reference is made to the accompanying drawings which show by way of illustration, four specific embodiments in which the invention may be practiced.

It should be noted that in the different embodiments, the same elements are referenced by the same number for clarity.

Figure 1:
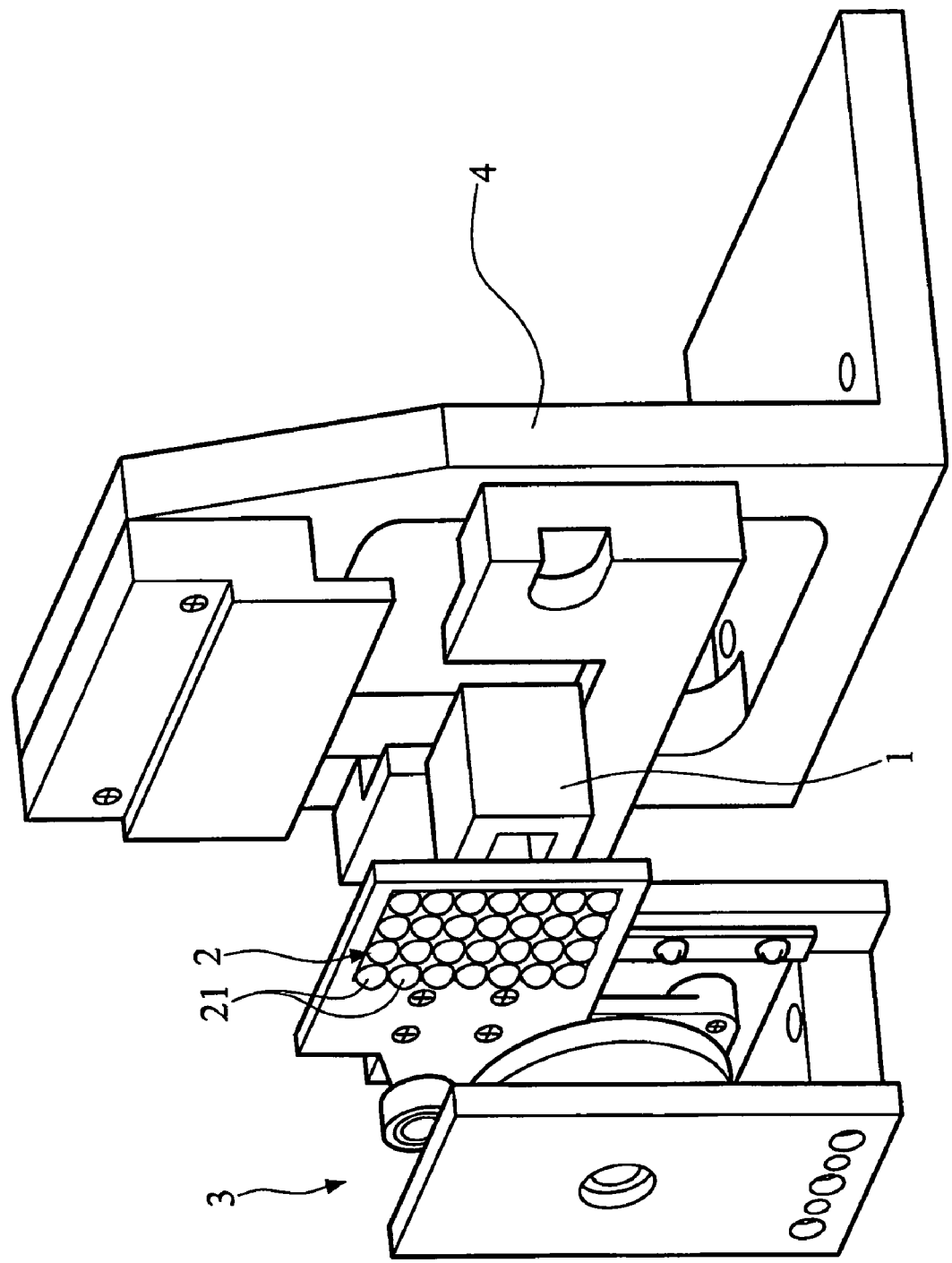
FIG. 1 is a schematic view of a first embodiment of the invention.
Figure 2:
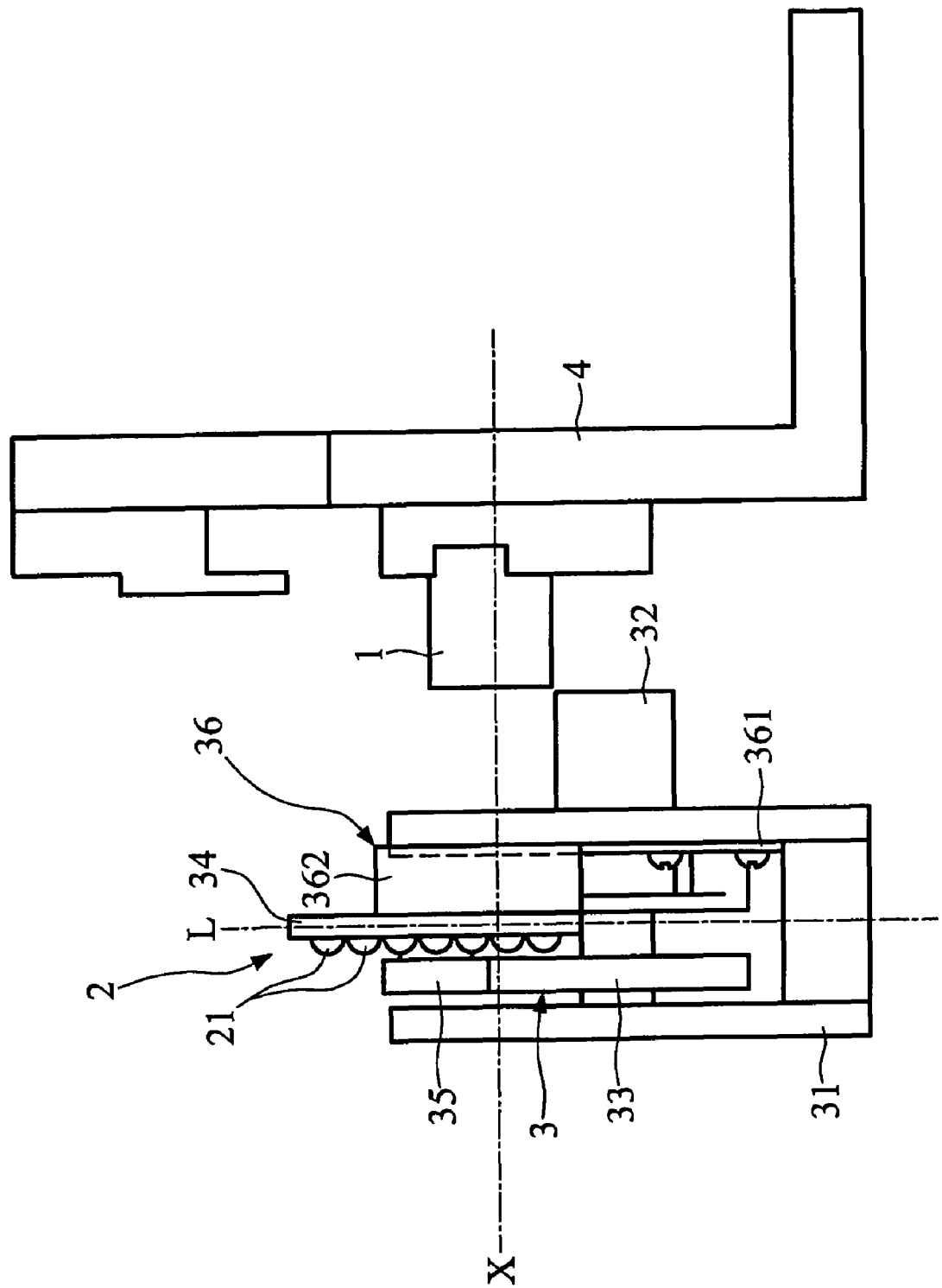
FIG. 2 is an elevation view showing the disposition of an activating member, a cam and a passive member.
Figure 3:
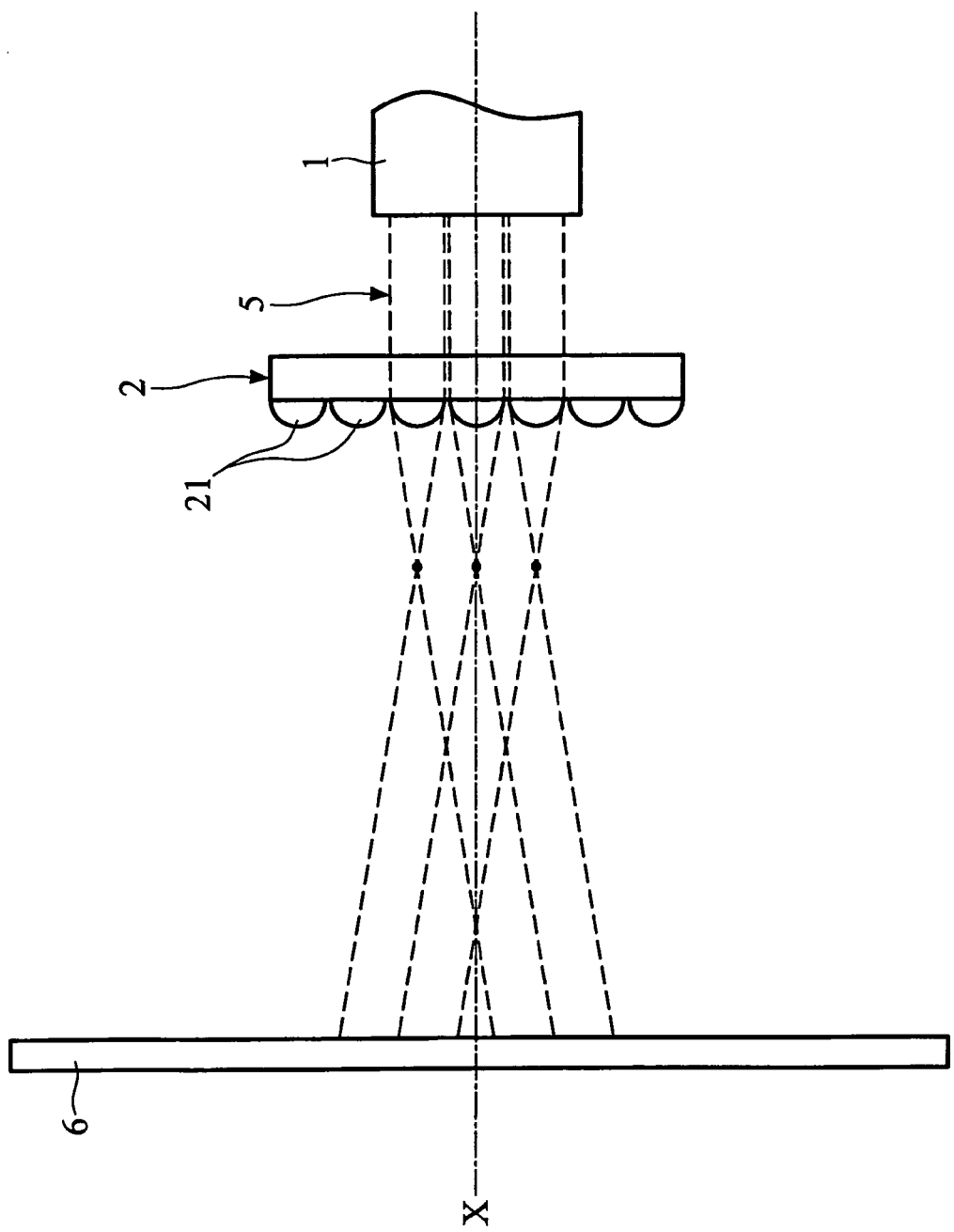
FIG. 3 is an elevation view showing a light beam refracted by a complex lens being projected on a screen.

Referring to FIGS. 1, 2 and 3, a first embodiment of the invention provides a light emitting system comprising a light generator 1, a complex lens 2, an activating unit 3 and a main base 4.

The light generator 1 provides a light beam 5 emitted in a first direction in parallel to an optic axis X. The light generator 1 is a laser generator or light emitting diode, and the light beam 5 is a laser beam or a monochromatic beam.

The complex lens 2 is disposed on a path of the light beam 5 facing the light generator 1. The complex lens 2 comprises a plurality of micro structures 21 for diffracting the light beam 5. The micro structures 21 are evenly distributed. The micro structures 21 comprise micro lenses or micro prisms. In the embodiment, the micro structures 21 are micro lenses arranged in a matrix. In the embodiment, the complex lens 2 faces the light generator 1, but it is not limited thereto. The complex lens 2 can be disposed perpendicular to the light generator 1, with the light beam 5 guided to the complex lens 2 by diffraction.

The activating unit 3 comprises a support base 31, an activating member 32, a cam 33, a frame 34, a passive member 35 and a sliding assembly 36. The activating member 32 is disposed on the support base 31. The cam 33 is activated by the activating member 32. The frame is disposed on the support base 31 and reciprocally moves in a second direction (an axis L) alternate to the optic axis X. The passive member 34 connects with the frame 34 and abuts the cam 33. The sliding assembly 36 is disposed between the frame 34 and the support base 31. The sliding assembly 36 has a track 361 disposed along the axis L on the support base 31, and a sliding block 362 fixed on the frame 34 and disposed on the track 361. The complex lens 2 is disposed on the frame 34. Through the connection described, the activating member 32 connects with the complex lens 2 and activates the complex lens 2 with an activation frequency to reciprocally move along the axis L. In the embodiment, the activating member 32 is a motor, and the activation frequency is not smaller than 24 cycle/sec.

The light generator 1 is disposed on the main base 4.

Figure 4:
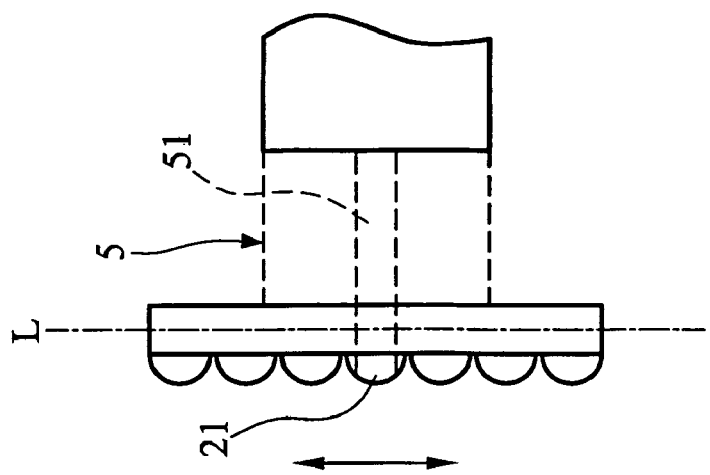
FIG. 4 is an elevation view showing the movement of a speckle, formed by a light beam, on the screen.
Figure 4:
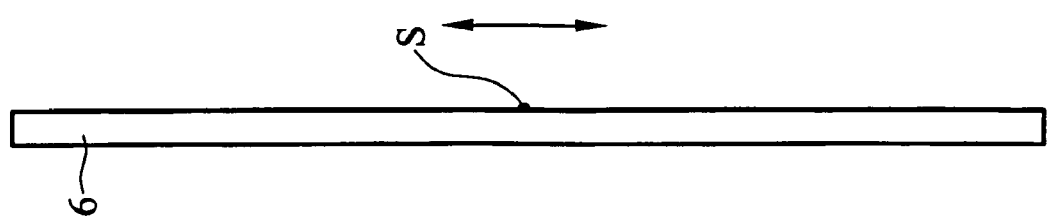

Referring to FIG. 4, when the light beam 5 is diffracted through the micro structures 21 and projected on a screen 6, the light beam 5 refracted by the micro structures 21 has uniformly distributed energy due to the short focus characteristic of the micro structures 21. Meanwhile, the activating member 32 of the activating unit 3, driven by the cam 33 and the passive member 35, activates the micro lenses 2 with an activation frequency to reciprocally move along the axis L. Accordingly, when any of the light beam 51 refracted by one micro structure 21 is projected on the screen 6, a speckle S, formed by the light beam 51, reciprocally moves within an area of the screen 6 along with the micro structure 21 in a second direction (the axis L).

The light emitting system of the invention comprises the following advantages:

First, the disposition of the micro lenses 2 allows the light beam 5 to be refracted by the micro structure 21, to provide light with uniformly distributed energy.

Second, because the speckle S reciprocally moves with an activation frequency within the area on the screen 6 in a second direction (the axis L), the eyes may eliminate the existence of the speckle S when observing the light beam 5 on the screen due to photogene effect.

Figure 5:
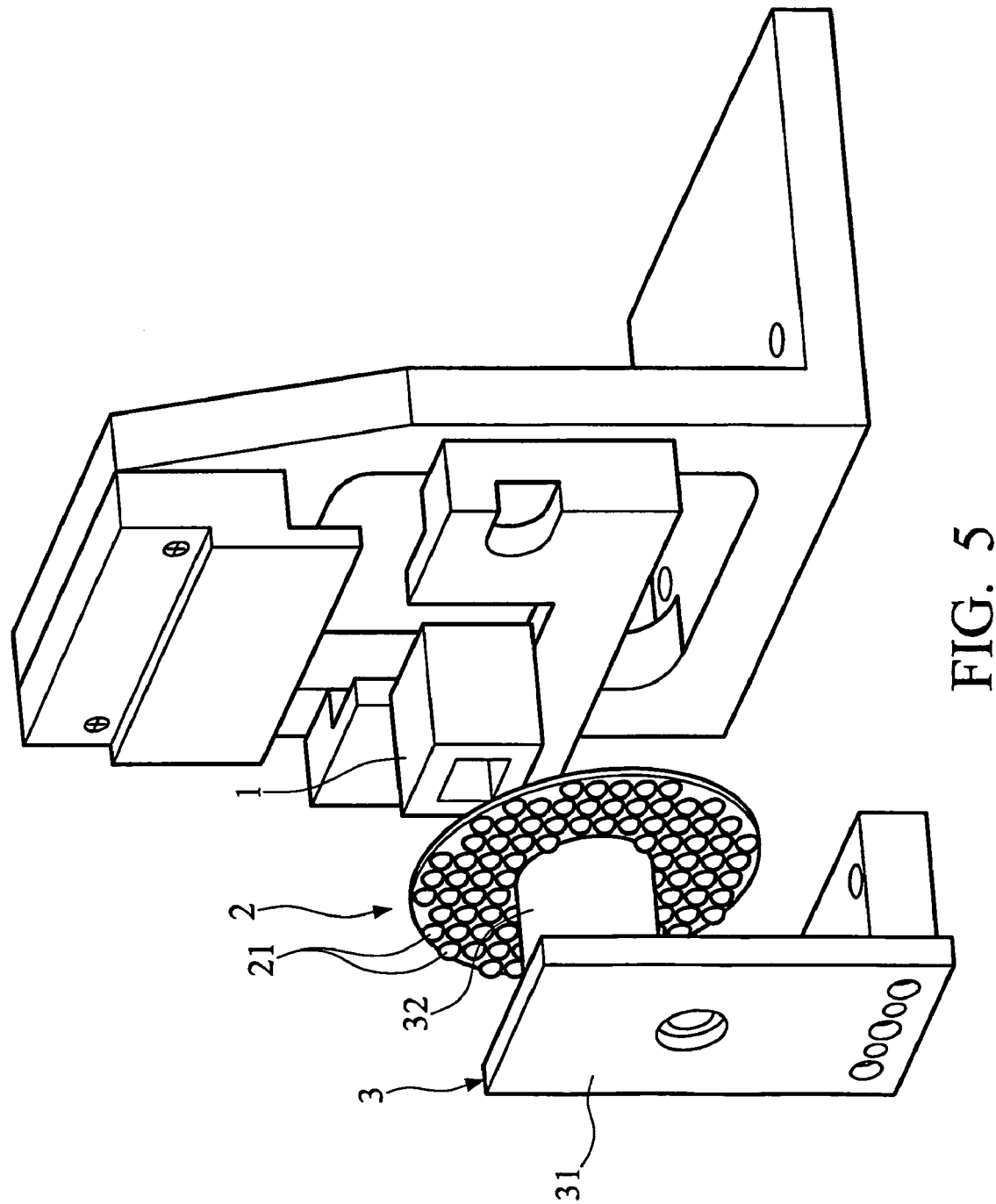
FIG. 5 is a schematic view of a second embodiment of the invention.
Figure 6:
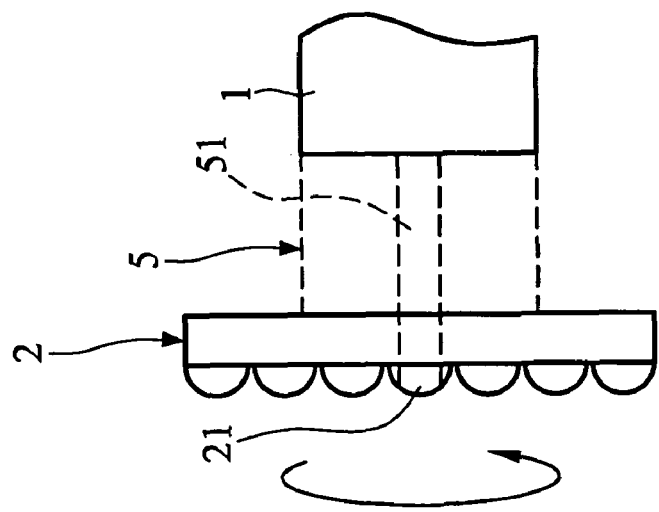
FIG. 6 is an elevation view showing the movement of a speckle, formed by a light beam, on the screen.
Figure 6:
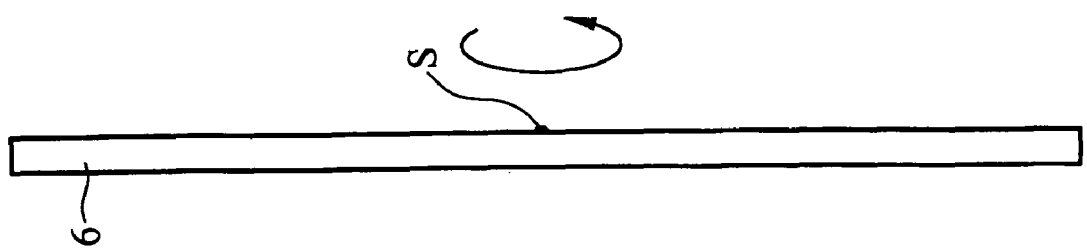

Referring to FIGS. 5 and 6, a second embodiment of the invention provides a light emitting system, similar to the first embodiment. The main differences are the shape of the micro lens 2 and the assembly of the activating unit 3. The activating unit 3 comprises a support base 31 and an activating member 32 disposed on the support base 31 and coupled to the complex lenses 2. The activating member 32 activates the micro lenses 2 with an activation frequency to rotate the complex lens relative to the light generator 1. It should be noted that in the embodiment, the activating member 32 is a motor, the diameters of the micro structures is 0.5 mm and the preferred activation frequency is 5000 rpm, but it is not limited thereto.

When the light beam 5 is diffracted by the micro structures 21, the light beam 5, refracted by the micro structures 21, provides light with uniformly distributed energy because of the short focus characteristic of the micro structures 21. Meanwhile, the micro lenses 2 is rotated relative to the light generator 1 by the activating member 32 of the activating unit 3 with an activation frequency. Accordingly, when any of the light beam 51, refracted by one micro structure 21 is projected on the screen 6, a speckle S, formed by the light beam 51, reciprocally moves within an area of the screen 6 along with the micro structure 21.

Compared to the light emitting system of the first embodiment, fewer components are required by the activating unit 3 of the light emitting system of the second embodiment. The light emitting system of the second embodiment presents the same performance as the one of the first embodiment, but further reduces required parts and manufacturing costs.

Figure 7:
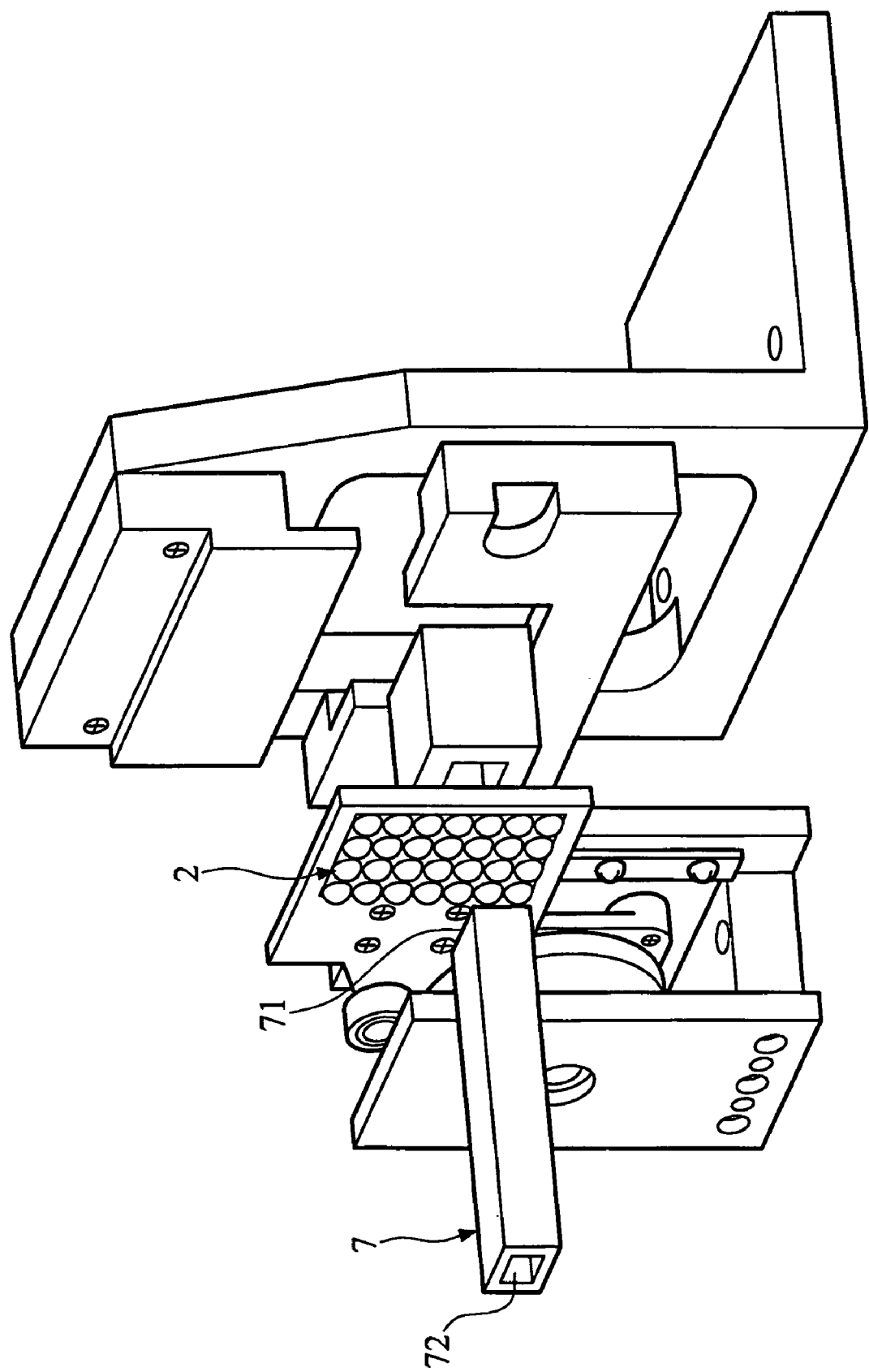
FIG. 7 is a schematic view of a third embodiment of the invention.

Referring to FIGS. 3, 4 and 7, the invention provides a third embodiment of a light emitting system, similar to the first embodiment. The main difference is that the light emitting system of the third embodiment further comprises a guiding tube 7 disposed corresponding to the complex lenses 2. The light beam 5 is refracted by the complex lenses 2 and results in direct light beams and refracted light beams. In other words, the path of the light beam 5 is changed to form a plurality of light points, guiding with the guiding tube 7. The direct light, diffracted light and the refracted light of the light beam 5 are then guided by the high reflective surface within the interior of the guiding tube 7 from a light inlet 71 to the light outlet 72.

Figure 8:
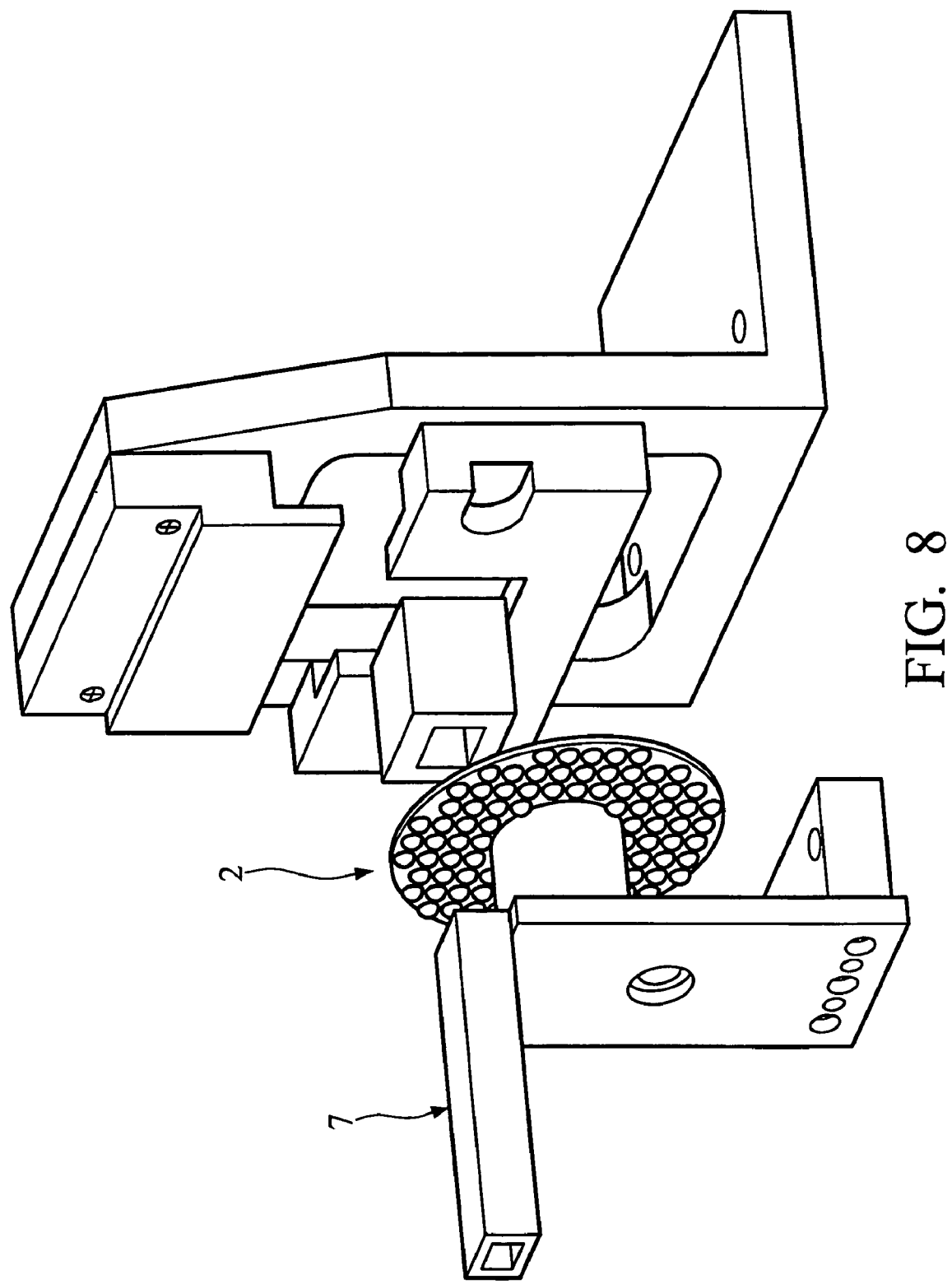
FIG. 8 is a schematic view of a fourth embodiment of the invention.

Referring to FIGS. 6 and 8, the invention provides a fourth embodiment of a light emitting system, similar to the second embodiment. The difference is that the light emitting system of the fourth embodiment further comprises a guiding tube 7 disposed corresponding to the complex lenses 2. After the light beam 5 is refracted by the complex lenses 2, the path of the light beam 5 is changed to form a plurality of light points due to the characteristics of short focus and diffraction of the micro structures 21. As a result, the light energy is uniformly distributed to achieve uniform brightness. Finally, the light beam 5 is transmitted by the guiding tube 7 and then projected.

The invention comprises the disposition of the complex lenses 2, allowing the light energy of the light beam 5 to be uniformly distributed. Additionally, by utilizing the activating unit 3, the speckle S is able to reciprocally move or rotate to create photogene reaction, such that the existence of the speckle can be eliminated While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light emitting system, comprising
   a light generator, providing a light beam emitted in a first direction in parallel to an optic axis;
   a complex lens, disposed on a path of the light beam, comprising a plurality of micro structures for refracting the light beam; and
   an activating unit, comprising an activating member coupled to the complex lens, wherein the activating member activates the complex lens with an activation frequency to reciprocally move in a second direction alternate to the first direction.

2. The light emitting system as claimed in claim 1, further comprising a guiding tube, receiving the light beam from the complex lens.

3. The light emitting system as claimed in claim 1, wherein the micro structures of the complex lens are arranged in a matrix.

4. The light emitting system as claimed in claim 1, wherein the micro structures comprise micro lenses.

5. The light emitting system as claimed in claim 1, wherein the activating unit further comprises:
   a support base, wherein the activating member is disposed on the support base;
   a cam, activated and rotated by the activating member;
   a frame, disposed on the support base, reciprocally moving in the second direction, wherein the complex lens is disposed on the frame;
   a passive member connected with the frame and abutting the cam; and
   a sliding assembly disposed between the frame and the support base.

6. The light emitting system as claimed in claim 5, wherein the sliding assembly has a track disposed along the first direction, and a sliding block fixed on the frame and disposed on the track.

7. The light emitting system as claimed in claim 1, further comprising a main base, wherein the light generator is disposed on the main base.

8. A light emitting system, comprising
   a light generator, providing a light beam emitted in a first direction in parallel to an optic axis;
   a complex lens, disposed on a path of the light beam, comprising a plurality of micro structures for refracting the light beam;
   an activating unit, comprising an activating member coupled to the complex lens, wherein the activating member activates the complex lens with an activation frequency to rotate the complex lens relative to the light generator.

9. The light emitting system as claimed in claim 8, further comprising a guiding tube, receiving the light beam refracted by the complex lens.

10. The light emitting system as claimed in claim 8, wherein the micro structures comprise micro lenses with a diameter of 0.5 mm.

11. The light emitting system as claimed in claim 8, wherein the micro structures of the complex lens are arranged in a matrix.

12. The light emitting system as claimed in claim 8, further comprising a main base, wherein the light generator is disposed on the main base, and the activating unit further comprises a support base, wherein the activating member is disposed on the support base.

13. A light emitting system, comprising
a light generator, providing a light beam emitted in a first direction in parallel to an optic axis;
a complex lens, disposed on a path of the light beam, comprising a plurality of micro structures for refracting the light beam; and
an activating unit, comprising an activating member coupled to the complex lens, wherein the activating member activates the complex lens with an activation frequency to generate a relative motion between complex lens and the light generator.

14. The light emitting system as claimed in claim 13, wherein the activation frequency is a frequency of movement.

15. The light emitting system as claimed in claim 14, wherein the activating member activates the complex lens with the activation frequency to reciprocally move in a second direction alternate to the first direction.

16. The light emitting system as claimed in claim 13, wherein the activation frequency is a frequency of rotation.

17. The light emitting system as claimed in claim 16, wherein the activating member activates the complex lens with the activation frequency to rotate the complex lens relative to the light generator.

18. The light emitting system as claimed in claim 13, wherein the micro structures of the complex lens are arranged in a matrix.

19. The light emitting system as claimed in claim 13, wherein the micro structures comprise micro lenses with a diameter of 0.5 mm.

20. The light emitting system as claimed in claim 13, further comprising a guiding tube, receiving the light beam refracted by the complex lens.

\* \* \* \* \*